(12) United States Patent
Dionne

(10) Patent No.: US 10,733,308 B2
(45) Date of Patent: Aug. 4, 2020

(54) TAGS FOR UNLOCKING DIGITAL CONTENT

(75) Inventor: Mark S. Dionne, Newton, MA (US)

(73) Assignee: Cambium Learning, Inc., Dallas, TX (US)

( * ) Notice: Subject to any disclaimer, the term of this patent is extended or adjusted under 35 U.S.C. 154(b) by 2453 days.

(21) Appl. No.: 11/205,480

(22) Filed: Aug. 17, 2005

(65) Prior Publication Data

US 2007/0043670 A1    Feb. 22, 2007

(51) Int. Cl.
*G06F 21/62* (2013.01)
*G06Q 20/12* (2012.01)
*G06F 3/02* (2006.01)

(52) U.S. Cl.
CPC ......... *G06F 21/62* (2013.01); *G06Q 20/1235* (2013.01); *G06F 3/021* (2013.01)

(58) Field of Classification Search
CPC ........... G06F 21/10; G06F 21/60; G06F 21/62
See application file for complete search history.

(56) References Cited

U.S. PATENT DOCUMENTS

| | | | |
|---|---|---|---|
| 5,619,571 A * | 4/1997 | Sandstrom | G06F 21/6209 380/200 |
| 6,199,042 B1 | 3/2001 | Kurzweil | |
| 6,895,393 B1 * | 5/2005 | Numata | G06Q 20/1235 705/52 |
| 7,239,747 B2 | 7/2007 | Bresler et al. | |
| 2002/0143875 A1 | 10/2002 | Ratcliff, III | |
| 2002/0194162 A1 | 12/2002 | Rios | |
| 2003/0189648 A1 | 10/2003 | Nay et al. | |
| 2004/0054627 A1 * | 3/2004 | Rutledge | G06Q 10/087 705/50 |
| 2005/0096938 A1 * | 5/2005 | Slomkowski | G06F 21/34 705/51 |
| 2005/0165747 A1 | 7/2005 | Bargeron et al. | |
| 2005/0187943 A1 | 8/2005 | Finke-Anlauff et al. | |
| 2005/0216420 A1 * | 9/2005 | Padole | G06F 21/10 705/59 |
| 2006/0026105 A1 * | 2/2006 | Endoh | G06F 21/10 705/59 |
| 2006/0039030 A1 | 2/2006 | Peterschmidt | |
| 2006/0136748 A1 | 6/2006 | Bade et al. | |
| 2006/0200356 A1 | 9/2006 | Wan | |
| 2007/0011149 A1 * | 1/2007 | Walker | G06F 16/58 |
| 2007/0043669 A1 | 2/2007 | Dionne | |
| 2007/0043678 A1 | 2/2007 | Dionne | |
| 2007/0043810 A1 | 2/2007 | Dionne | |

OTHER PUBLICATIONS

Letter Pursuant to Rule 1.56.
Protected Viewing of Digital Files, U.S. Appl. No. 11/205,481, filed Aug. 17, 2005.
Optical Character Recognition Technique for Protected Viewing of Digital Files, U.S. Appl. No. 11/205,696, filed Aug. 17, 2005.
Techniques for Protected Viewing of Digital Files, U.S. Appl. No. 11/205,479, filed Aug. 17, 2005.
Unlocking Digital Content on Remote Systems, U.S. Appl. No. 11/205,490, filed Aug. 17, 2005.

* cited by examiner

*Primary Examiner* — Jay Huang
(74) *Attorney, Agent, or Firm* — Fish & Richardson P.C.

(57) ABSTRACT

Unlocking digital content embodied in digital readable form on a digital media carrier is described. Unlocking the digital content includes evaluating a code provided by a user scanning a tag attached to a printed, physical copy of the digital content; and if the code corresponds to an authorized code, unlocking the digital content.

22 Claims, 9 Drawing Sheets

TAGS FOR UNLOCKING DIGITAL CONTENT

BACKGROUND

This invention relates to techniques for unlocking digital content.

Some publishers publish books and other content on computer readable media such as compact disks (CD's). Other types and formats of digital media may be used to publish a book or other type of printed publication in digital form, such as a digital video disk, magnetic disk and the like. Generally, when content such as books and the like are published in a digital format they are published in a bitmap or PDF type format.

Publishers are understandably concerned about publishing content in digital format, in general, and accessible digital format in particular, because material published in digital format such as on a CD is easily illegally copied and distributed. In digital format, publishers risk losing control of a copyrighted work. Some publishers avoid making some or all of their content available in digital format, or protect the content to make the content difficult to copy and to access. Some schemes use encryption that requires a key for instance to unlock the CD to allow a user to retrieve text representation of the content from the CD.

Accordingly, publishers might want to protect content to prevent users from being able to view the content, duplicate the content exactly (e.g. by duplicating the entire CD), printing the content (e.g. printing a copy of the book from the CD), and extracting content, such as text or images, and using the extracted content by reformatting the extracted content, or translating the extracted content or incorporating the extracted content into some other form, such as for searching or indexing.

PDF format has an elaborate set of protections that address some of these protection issues. For example, in PDF, printing can be locked, as can be copying of text, or passwords can be used to lock and unlock copying and printing. In some applications, PDF uses "back door" methods that allow screen readers for the blind to access text, via secret passwords that publishers share with the manufacturers of the screen readers.

SUMMARY

Publishers do not necessarily want to publish content in digital format. Even for CD's storing digital content in an image format, e.g., PDF format, the CD is still easily copied. PDF is not equivalent to bitmap format, though its content can be optionally protected in various ways. Thus, if a publisher makes a bit-mapped or PDF version of the book available on CD the book can be viewed on the screen. While in PDF format, a user cannot extract a text file unless the user also has OCR software, the entire CD can nevertheless be copied. Thus, the book embodied in digital content on a CD can be copied relatively inexpensively, whereas the physical book is much harder to copy, and copying of an entire book is less practical.

Even when publishers publish books and the like on CD's publishers are reluctant to distribute the CD's, because users may copy the CD and avoid buying a physical copy of the book. Providing content available in digital formats such as CD's is desirable, because in some ways CD's are more accessible than a physical copy of a book. CD's are searchable and CD's can store additional content features. However, what restrains greater acceptance of publishing books on CD's is that there is no easy way to prevent copying of the CD's.

According to an aspect of the present invention, a method for unlocking digital content embodied in digital readable form on a digital media carrier includes evaluating a code provided by a user scanning a tag attached to a printed, physical copy of the digital content, and if the code corresponds to an authorized code, unlocking the digital content.

The following are embodiments within the scope of the claims.

The tag is a radio frequency identification tag. The digital media carrier is a compact disk is local to a user's machine. The digital media carrier is remote from a user's machine, and the method includes sending a message containing the code in the tag to a server over a network and receiving a message corresponding to evaluating the code at the server, the message allowing unlocking of the digital content if the code corresponds to the authorized code. The code in the tag is unique to the publication. The digital content is unlocked to provide a text-based searchable file. A tag reader is used to read the code on the tag. The digital content is a book stored on the digital media carrier and the physical copy corresponding to the digital content on the digital media carrier is a printed copy of the book. The digital content is a book stored on the digital media carrier accessible through a web site on the Internet and the physical copy corresponding to the digital content on the digital media carrier is a printed copy of the book. The tag is part of the printed, physical copy of the digital content, and the tag carries a bar code.

According to an additional aspect of the present invention, a computer program product for unlocking digital content embodied in digital readable form on a digital media carrier comprises instructions to prompt a user to scan a tag attached to a printed, physical copy of the digital content, evaluate a code provided by the user scanning the tag, and if the code corresponds to an authorized code, unlock the digital content.

According to an additional aspect of the present invention, an apparatus includes a processor and a computer readable medium storing a computer program product for unlocking digital content embodied in digital readable form on a digital media carrier comprises instructions to prompt a user to scan a tag attached to a printed, physical copy of the digital content, evaluate a code provided by the user scanning the tag, and if the code corresponds to an authorized code, unlock the digital content.

One or more aspects of the invention may provide one or more of the following advantages.

By using a tag such as an RFID tag or the like, the RFID tag is affixed to the physical copy of the publication and can be used to verify that a user has physical possession of a printed copy of the content. Some libraries use RFID tags for inventory management. Thus, it would be relatively simple for book publishers, particularly school book publishers, to add RFID tags with unique codes to books. Alternatively, in place of an RFID tag and RFID reader a barcode and bar code reader could be used.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
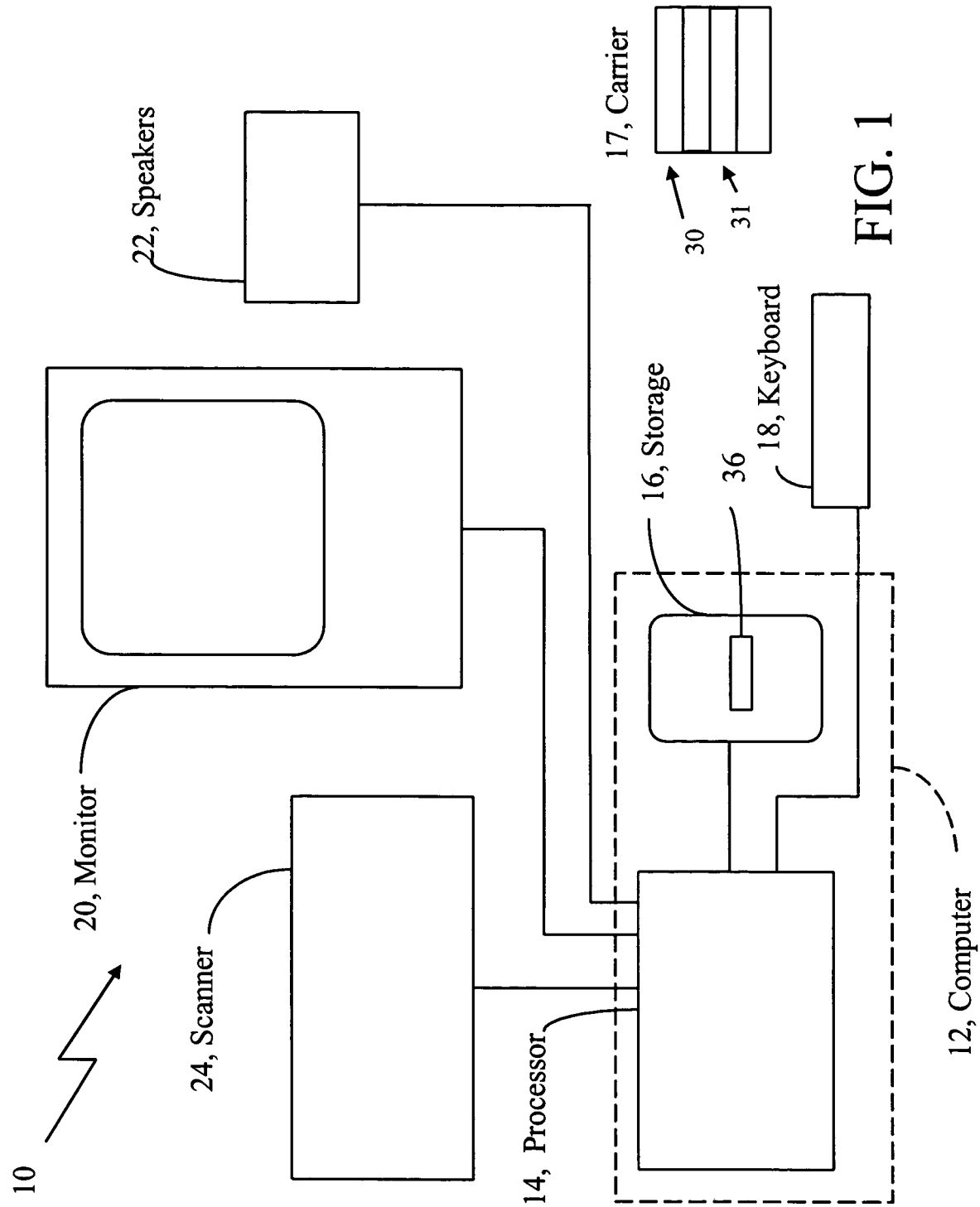
FIG. 1 is a block diagram view of a reading system.

Referring now to FIG. 1, a computing device 10, such as a personal computer, a personal digital assistant, a specialized computing device or a reading machine and so forth, includes a computer system 12. The computer system 12 is generally a personal computer or can alternatively be another type of computing machine and typically includes a central processor unit (CPU) 14. In addition to the CPU 14, the system includes main memory, cache memory and bus interface circuits (not shown). The computer system 12 includes a mass storage element 16, here typically the hard drive associated with personal computer systems.

The reading system 10 further includes a keyboard 18, a monitor 20, as well as speakers 22, a sound card (not shown), a pointing device such as a mouse (not shown) and a scanner 24 all coupled to various ports of the computer system 10, via appropriate interfaces and software drivers (not shown). The computer system 12 here operates under a Windows XP® Microsoft Corporation operating system. Alternatively, other operating systems could be used. The computer system 12 also includes a digital media carrier 17 that is read by the computer system 12 using a drive, e.g., a CD or CD/DVD drive, etc. (not shown).

The digital media carrier 17 can be a compact disk (CD), a DVD, flash memory card, a web site (FIG. 6), or other medium for storing digital data and so forth, and includes digital media unlocking software 30 and locked digital content 31. The digital media unlocking software 30 will be described as residing on the CD and will be loaded into the computer system 12 for execution, however other arrangements are possible, such as digital media unlocking software 30 being part of another application, or an operating system and so forth.

The digital media unlocking software 30 controls access to the locked digital content 31 stored on the digital media carrier 17. In one example, a CD includes a book or other type of printed publication on the CD as the locked digital content 31, and a user uses the digital media unlocking software 30 to unlock the locked digital content 31. Various levels of access can be provided by unlocking the CD. Unlocking the CD can include gaining access to a bitmap image of the contents, a text version of the contents, searching features, special enhancements, and so forth. Other uses are for unlocking digital content on the Internet, as described in FIGS. 6 and 7. Thus, in general the digital media unlocking software 30 unlocks the locked digital content whether the locked digital content 31 is locally stored such as on a CD or remotely stored such as on a web site on the Internet.

The unlocking software 30 requires that the user have possession of a physical copy of the book corresponding to the content stored on the CD. In one example, the locked digital content 31 includes a book, and the unlocking software 30 requires that the user has physical possession of the book. It is presumed that if the user has a physical copy of the book, then the user bought the book and it is possible that the CD is not an unauthorized copy of the CD. That is, the approach presumes that whoever is reading the physical book owns the book, and is therefore likely authorized to be reading that copy of the book on the CD.

Figure 2:
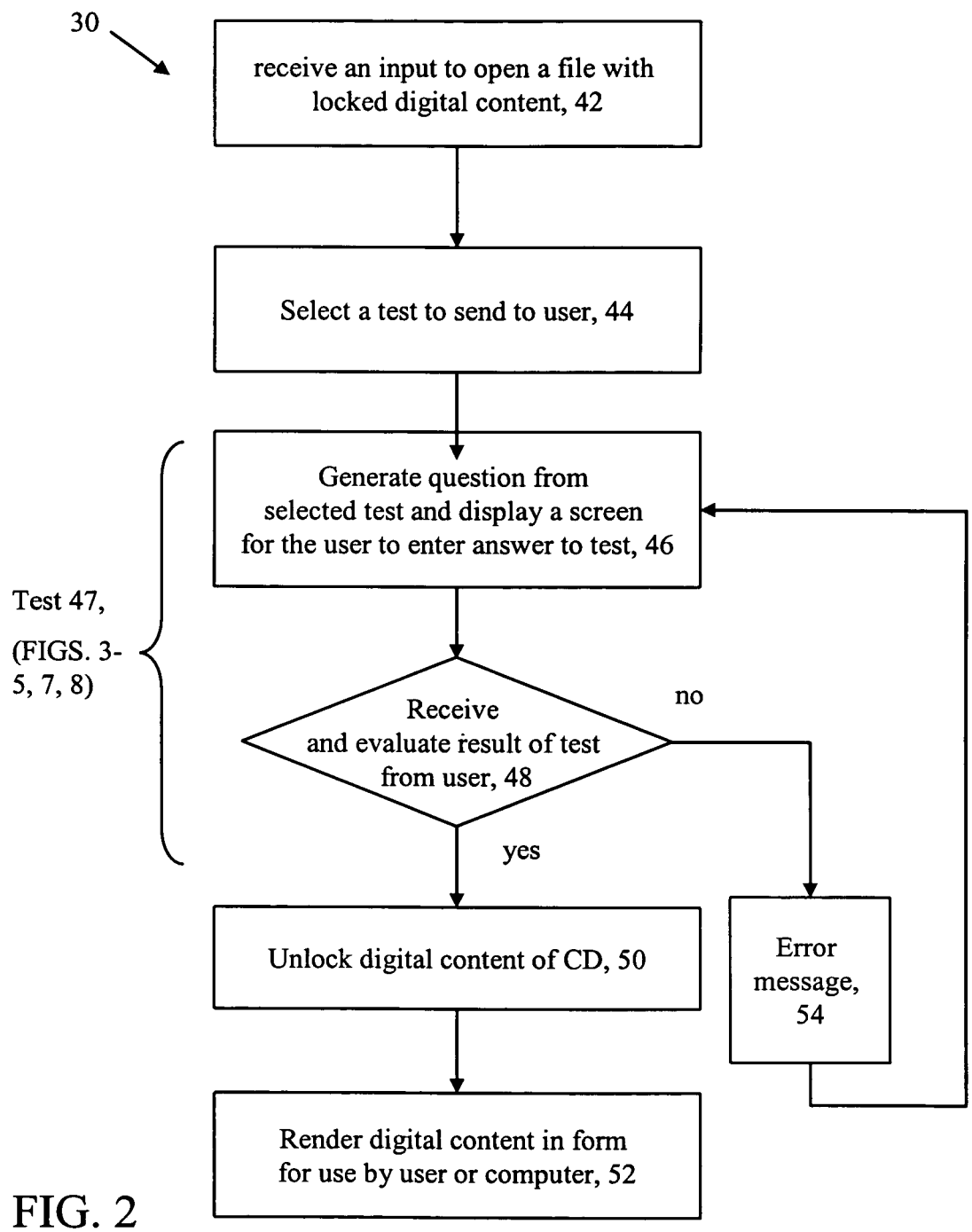
FIG. 2 is a flow chart depicting a technique for unlocking digital content embodied on a computer readable medium.

Referring to FIG. 2, a process 30 for unlocking digital content from a CD is shown. Initially, the process can start in a variety of ways. For example, a CD can be placed in a CD or DVD/CD drive and the like and an "auto play" feature of the CD drive/operating system can attempt to open a file on the CD. Alternatively, a user can attempt to open digital content on CD by selecting a file on the CD with a cursor and mouse, and so forth.

Upon receiving 42 an input to open a file with locked digital content, the process 30 selects 44 a test and/or a test type to send to user. The process 30 generates 46 the test from the selected test type and, in general, displays a user interface screen including the test and a field for the user to enter an answer to the test or the like. The user answers the test posed by process 30 and the process 30 evaluates 48 the answer supplied by the user to see if the answer was correct. Different embodiments 47a-47d of tests and evaluations 47 are described in FIGS. 3-5, and 8 below.

If the test was answered correctly, the process 30 unlocks 50 the digital content, e.g., by decrypting the file with the digital content or supplying a password to open the file. The process 30 renders 52 unlocked digital content. For example, the unlocked digital content can provide a text file, a text based searchable file, active content and so forth. If the test was not answered correctly an error message can be generated 54 asking the user to try again, and the number of times that the error message is generated can be tracked, so that if the error exceeds a threshold, the software 30 can become disabled.

The tests that the process 30 selects from are based on testing whether the user has physical possession of the book. The process 30 selects from a number of tests. In some implementations, the tests are selected at random whereas in others the tests are selected based on the type of user or the use to which the user desires to put the digital content. In other arrangements, the process 30 does not select a test type, but rather generates a specific test from a test type predefined for the process 30. Considerations for selecting the test are to make the test reasonably difficult to defeat and different each time to avoid cheating, but not so difficult such that intended users would not be able to figure out how to use the unlocking process 30.

Effectively, the "test" and the correct answer to the test is stored on the media carrier 17, and it is either encrypted or otherwise made hard to find. For example, there could be a list of questions stored on the CD along with the correct answers. The test can be built into a special program that is customized and burned onto the CD, or it could be a set of (encrypted) data on the CD that is accessed by a general program. In the case of the ISBN test (discussed below), the correct ISBN is saved on the CD in an encrypted form or in some manner that it is hard to find, so that the number can be compared to the user's answer. Similar concepts hold for the other cases such as scanning, RFID etc., as will be discussed below.

Figure 3:
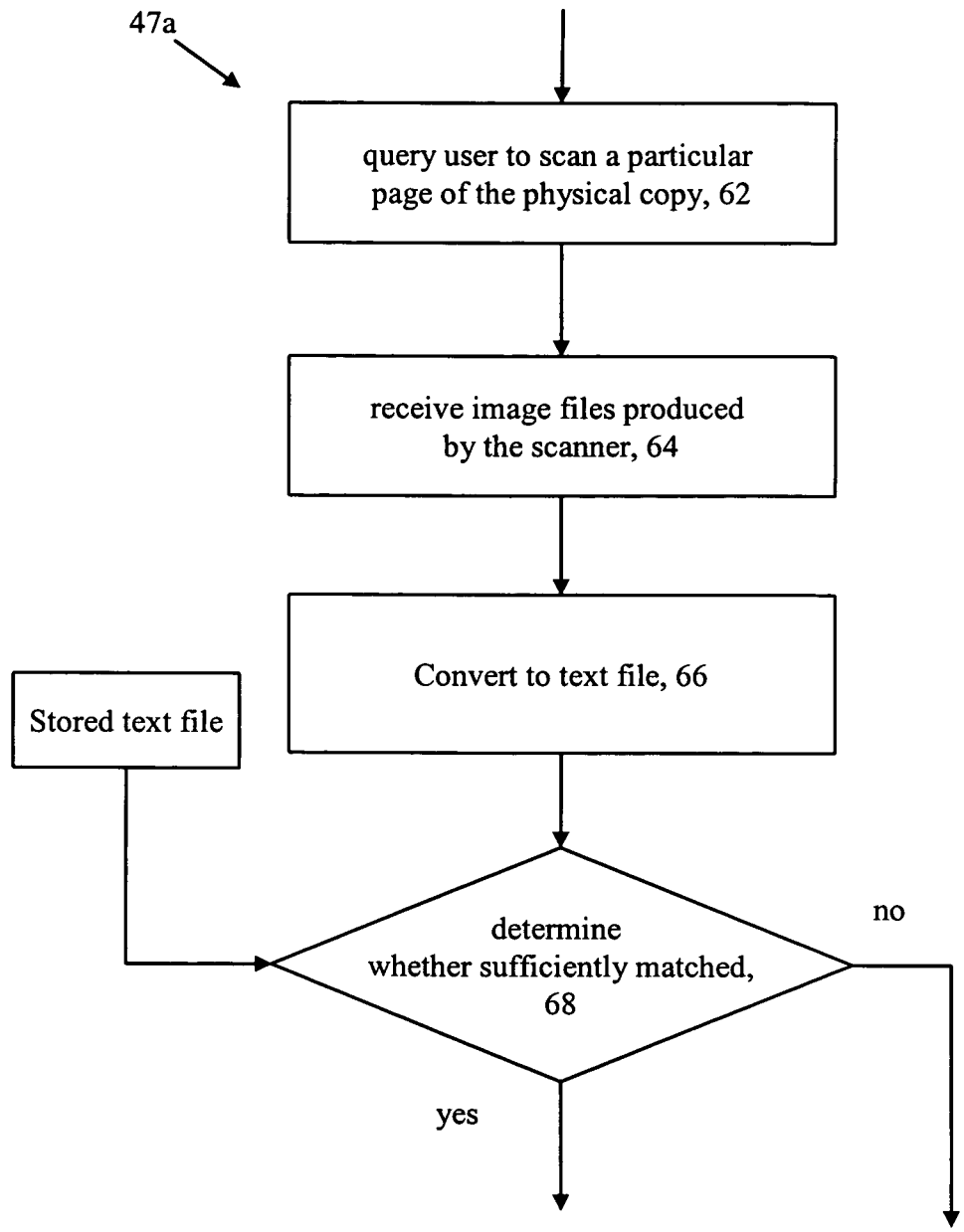
FIGS. 3-5 are flow charts of techniques useful in the unlocking technique of FIG. 2.

Referring to FIG. 3, a test type 47a involves a user with a reading machine, e.g., a personal computer or the like including reading software that receives a digital file containing text, and converts the digital file to synthesized speech and reads the contents aloud to the user. In reading machine applications (discussed in FIG. 9 below in greater detail), it is often common to have a scanner available with the reading machine. The test type 47*a* using a scanned image, reads the CD and before proceeding, by displaying the digital content or making a text version of the digital content available, asks 62 the user to scan a particular page of the physical copy of the book. The user places the selected page on a scanner and scans the page. The scanner produces an image file that is received 64 by the process 47*a*. The image file corresponds to the scanned page. The test type 47*a* converts 66 the image file using Optical Character Recognition (OCR) processing and determines 68 whether the received image file sufficiently matches to the correct page or not.

If the process determines that user has the physical copy of the book, the test type 47*a* unlocks 50 (FIG. 2) the CD and makes the digital content available. The process 47*a* can proceed to allow the user to use the digital content for a period of time and after the period of time has elapsed, run the check again using a different page to make sure the user still has the book.

One way that the test type 47*a* determines if there is a sufficient match is to produce a text file of the scanned page that is compared to a stored version of the text file on the CD to determine if the user has the book. Alternatively, the OCR can generate a signature that is compared to a signature generated from the stored file to determine whether the user had the book. Another way to determines if there is a sufficient match is to examine the content using OCR to recognize text on the page and use some heuristic to see if the recognized text matches sufficiently to the text stored in the file on the CD.

Another way to determine if there is a sufficient match would be to use less than a full OCR process to determine that the image page was sufficiently correct. With less than a full OCR processing, the test type 47*a* need not determine whether text was recognized correctly, but merely whether the image file has a page arrangement, e.g., produced locations of probable text, that correspond to a stored version of the expected page arrangement, e.g., regions of probable text. Different gradations can be used. For instance, less than a full OCR processing can merely determine the number of lines of text, probable regions of text vs. images, arrangement of regions of text on the page, and so forth. Correspondence between the image and the stored version expected need only be close enough to assure that the user has the correct page and physical possession of the book.

The OCR need not be of high enough quality to recognize text, but rather need only show that the text is more or less arranged in the manner expected to be arranged on that page. This does not require a high quality scanner. As an alternative to a scanner, a user could a digital camera or a web cam. The unlocking could be based on detecting a certain pattern of color. The color is in some sense easier to detect, but is somewhat more difficult to copy.

Various approaches can be used to lock the digital content on the CD. For example, the digital content can be only partially locked so that a user can put the CD in the drive and the CD will generate thumbnails of the pages for display on the user's monitor. When the user wants to access one of the pages, the user would have to unlock the page using the unlocking software. The thumbnails provide limited access to allow the user to verify that the user has the correct CD.

Figure 4:
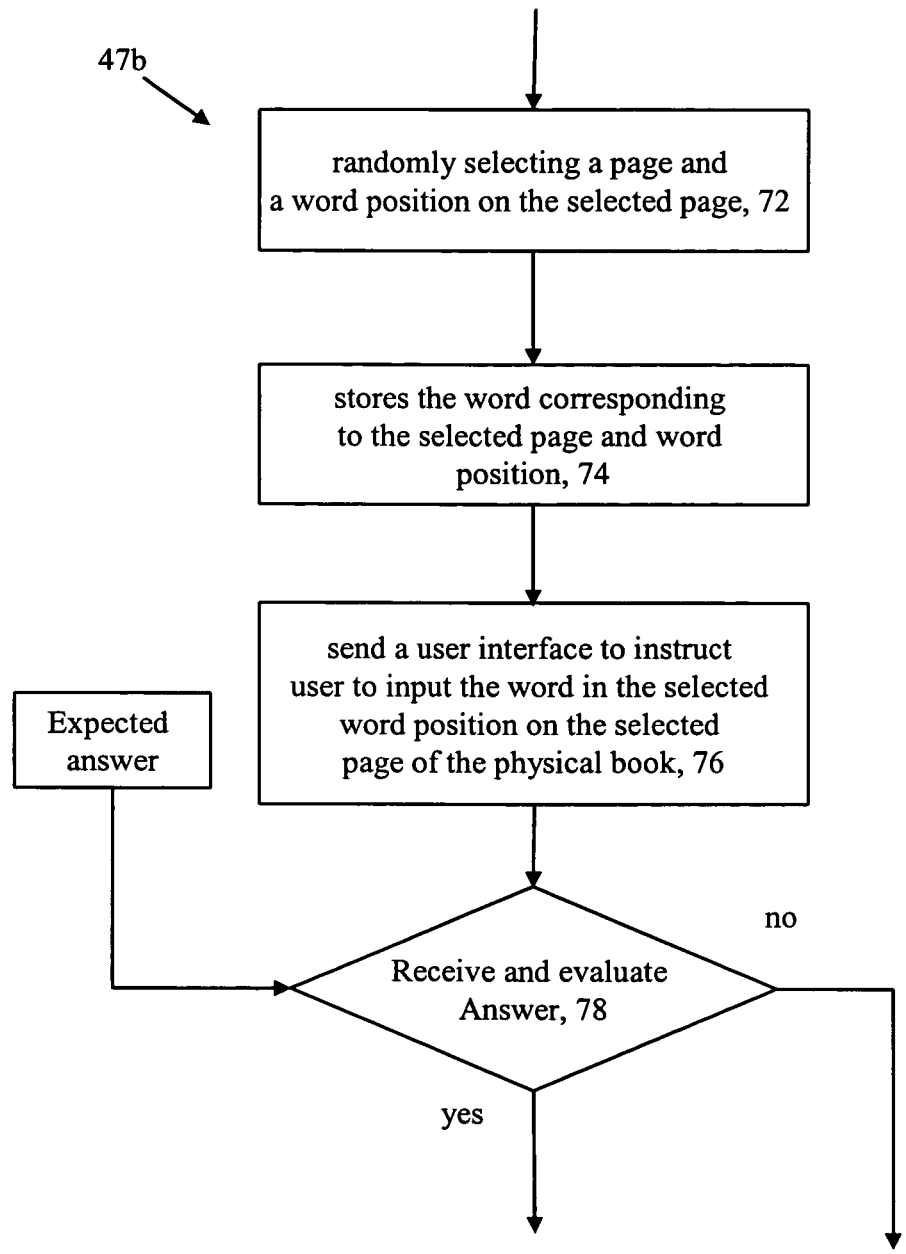

Referring to FIG. 4, an alternate test type process 47*b* is applicable to a more general case where a publisher wants allow users to unlock the digital content 31 of the file based on supplying content from the physical book. Throughout the description we will use text as an exemplary type of content that the user is asked to supply. However, the content can be generalized to the various components of the content, e.g., text, graphics, photos, audio clips, video clips and so forth. This test type 47*b* need not have a scanner. Test type 47*b* generates the test by randomly selecting 72 a page and a word position on the selected page. Test type 47*b* stores 74 the word and page. Test type 47*b* sends 76 a user interface instructing the user to open the book and turn to the specific, selected page and instructs the user to type or otherwise input into the computer the word that appears in the selected word position on the selected, specific page. Test type 47*b* will receive the answer and check 78 to see if the answer was correct, thus providing or denying access.

The test type 47*b* randomly generates 72 the selected page and word position each time the test type 47*b* is executed. Alternatively, the test type 47*b* can store a list of, e.g., 50 combinations of page numbers and words at selected word positions or the same word position, e.g., the first word on the page. The test type 47*b* would generate a test based on one of these combinations each time the test type 47*b* is executed. In addition to a word, phrases, sentences, and so forth, could also be used.

Figure 5:
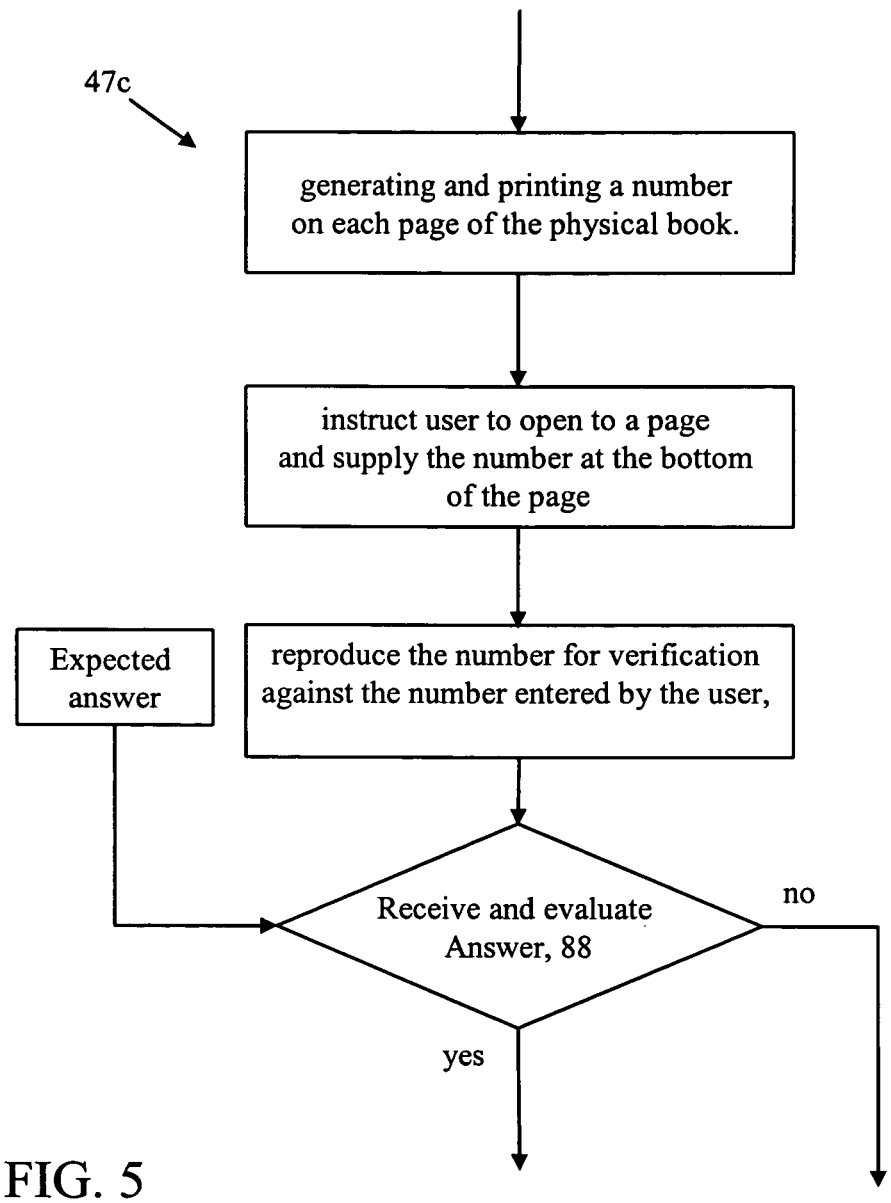

Referring to FIG. 5, an alternate test type 47*c* includes a printed number on the bottom on the page generated by an algorithm and printed 82 during printing of the physical copy of the book. Each page of the physical copy of the book would have an apparently random number at, e.g., the bottom of the page. For example, the number can be computable based on the page number and a pseudorandom number generator using the page number as the seed. For example, the algorithm encrypts the page number, multiplies the page number by a key and hashes page number/key or any other technique to obscure the page number so long as the technique can be regenerated by the unlocking process 30.

When a user desired to obtain access to the content on the CD, the test type 47*c* instructs 84 the user to open to a page and supply the number at the bottom of the page to the process. The test type 47*c* uses the algorithm to reproduce 86 the number for verification 88 against the number entered by the user.

One of the features of test type 47*c* is that the number does not need to be printed on the CD version of the book. Test type 47*c* requires the user to have physical possession of the entire book to unlock the digital content on the CD consistently. Merely using words on the page, allows a user to see the words in the CD version, once the user opens the book. Thus, if the same word position is always used, the user could write the, e.g., first word on each page down and thus open the book, without necessarily always having physical possession of the book.

Many methods can be used to secure the number at the bottom of the page. For example, the page number can be run through an e.g., 128-bit encryption algorithm, producing a relatively large encrypted copy of the page number. That encrypted page number can be truncated with a function that selects several of the digits, e.g., the last three digits from the number to produce the number that is printed on the bottom of the page. Another method that is simple to use would be to use a hash code to obscure the number.

Another variation that is relatively easy to implement (but also relatively easy to defeat) is to require the user to enter the ISBN number that is printed on nearly every book that is published. Without the physical book in hand, a user would not know the number. However, this implementation is much easier to cheat, since all that is needed is to write the number down somewhere and save it for later use. An alternative is to have the user enter some item that appears on the cover of the book, since the cover will generally not be included in the digital content on the CD. Another alternative is to require the user to scan the bar code.

While printing a number on the bottom of the page is a relatively strong technique since it would require an unauthorized user to copy the entire book, publishers would have to incorporate the number in the printing process, which they might be reluctant to do. Using the ISBN number does not have this disadvantage since the number is already being printed. Another technique would be to imprint a single unique number on each physical copy of the book and produce CD's that are tied to that particular number.

Figure 6:
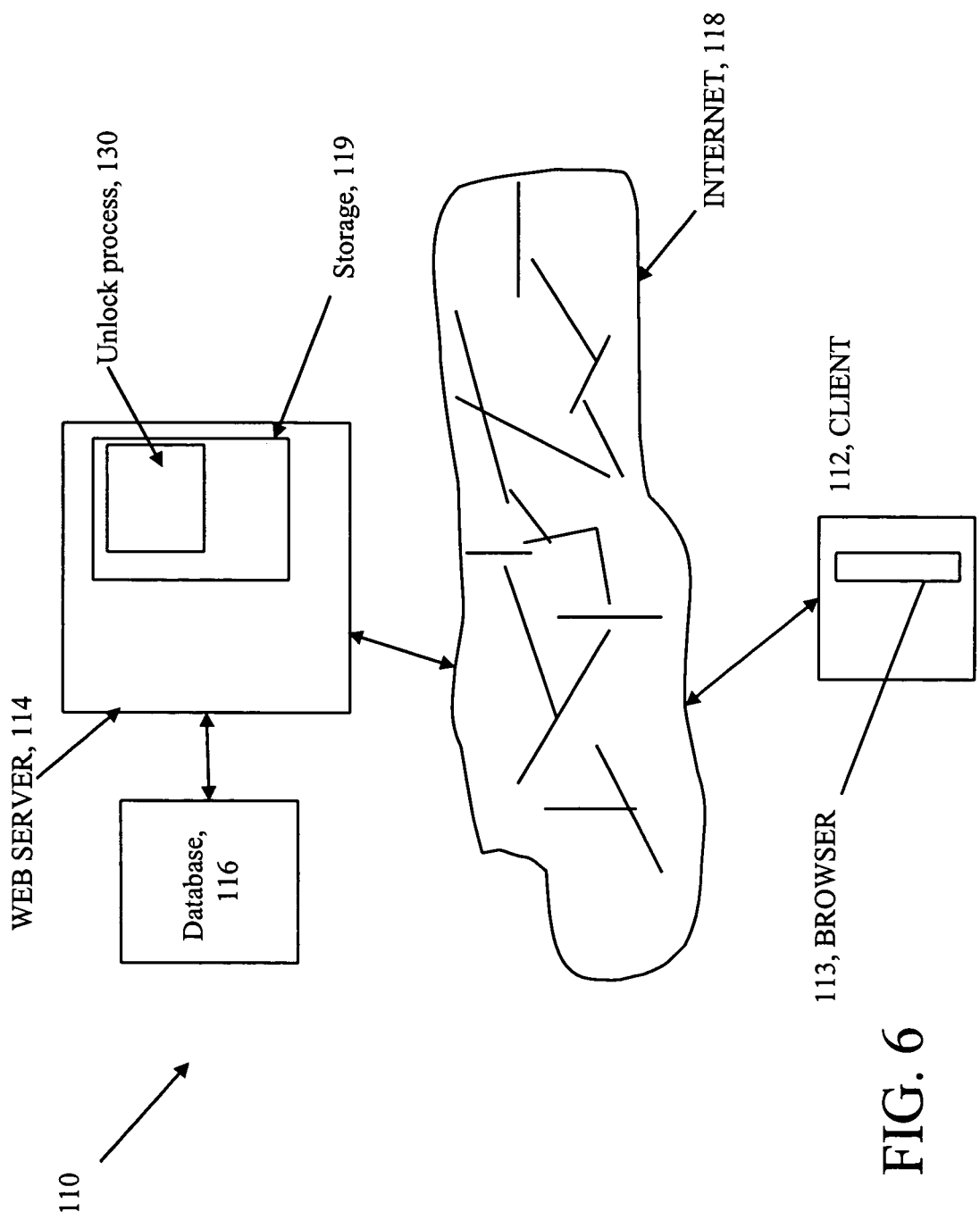
FIG. 6 is a block diagram of a network based system.

Referring to FIG. 6, another arrangement 110 for unlocking digital content is with the Internet 118. FIG. 6 shows a client system 112 that accesses a website hosted on a web server 114 (or equivalent) over the Internet 118. The web server 114 can make available books on-line, for viewing by accessing files containing the books in a database 116, etc. Websites make books available on-line, for limited viewing to see if a user desires to purchase the book. The website stores scanned versions of books in the database, and stores text files that allow for searching of the scanned versions of the book. The scanned and text files are locked and can be unlocked using the process 130 described in FIG. 7. Process 130 is generally stored in storage 119 on server 114. In some embodiments, process 130 communicates with client system 112 via a browser 113.

Figure 7:
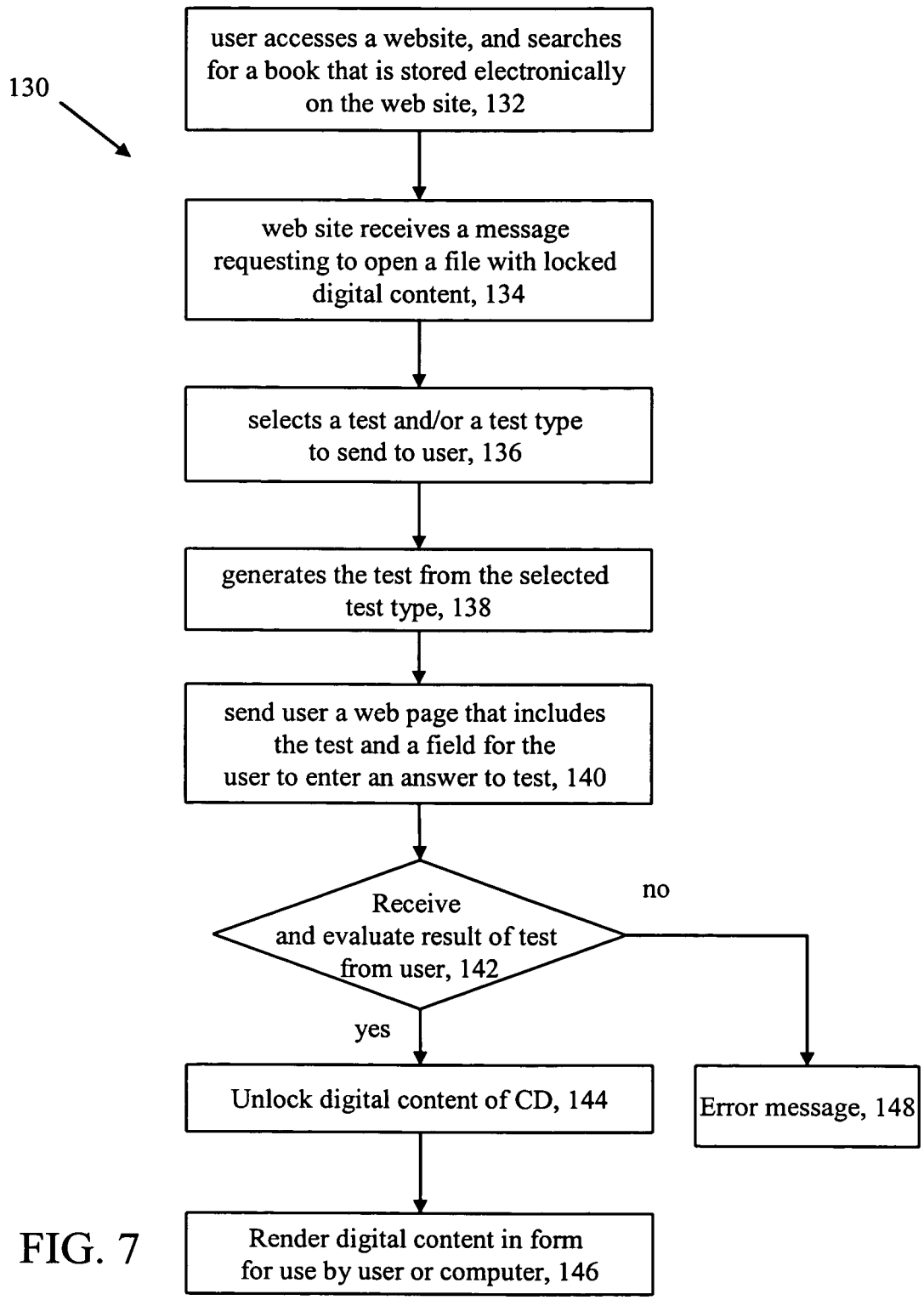
FIG. 7 is a flow chart of a network based unlocking technique.

Referring to FIG. 7, a process 130 for unlocking digital content on a web site is shown. A user accesses 132 a website, and searches for a book that is stored electronically on the web site. It is presumed that the user has physical possession of a physical copy of the book. The user may want to search the physical book and accesses the web site to use a search service that the website provides for users who have physical possession of the book. The process 130 for unlocking digital content from the web site is initiated typically by the user using a variety of techniques.

The web site receives 134 a message over the Internet requesting to open a file with locked digital content. This message can result from the user conducting a search, finding electronic content of interest and selecting a link, e.g., a hyperlink, to open the electronic content. The process selects 136 a test and/or a test type to send to user, from the test type processes 47a-c described above or process 47d described below. The process generates 138 the test from the selected test type and sends 140 the user a web page or the like that includes the test and a field for the user to enter an answer to test. The user answers the test and sends the answer back to the web site. The process 130 evaluates 142 the answer supplied by the user to see if the answer was correct. If the test was answered correctly, the process 130 unlocks 144 the digital content on the web site, e.g., by decrypting the file storing the digital content and so forth. The process 130 renders 146 digital content in form for use by user or computer under the control of the user. If the user answered incorrectly, an error message can be returned 148.

Unlocked digital content can include a text file, a searchable, index, text file, and special or enhanced features such as an animated presentation using a media player, e.g., a FLASH media player from (Macromedia, Inc. 600 Townsend Street San Francisco), etc. Unlocking digital content can also include unlocking audio content on a web site. For example, the website can make an audio book available to users who have the physical book.

The printed, physical copy of the book is relatively expensive and time consuming to copy. Availability of the physical book is easier to control than the availability of digital content. Thus, using a hard to copy source, such as the printed copy of the book to unlock an easy to copy digital data such as a digital content on a CD or a website permits the publisher of the media to control more effectively the digital content.

Unlike a license key, that often accompanies software; the unlocking process 30 or 130 can change every time an attempt is made to access the digital content, in order to verify that the user still has the copy of the book. Typically, the license key is used to unlock software once, during installation of the software on computer, and is in general, the same each time the license key is used. Thus, making copies of the license key and the CD allows for easy, often illegal distribution copies of the software. Whereas, with the unlocking process, the user must make an illegal copy of the entire physical book which while analogous to making copy of the key, is much more expensive and much more involved, than copying the key. Users would be less likely to copy the entire book and more inclined to buy the book.

Figure 8:
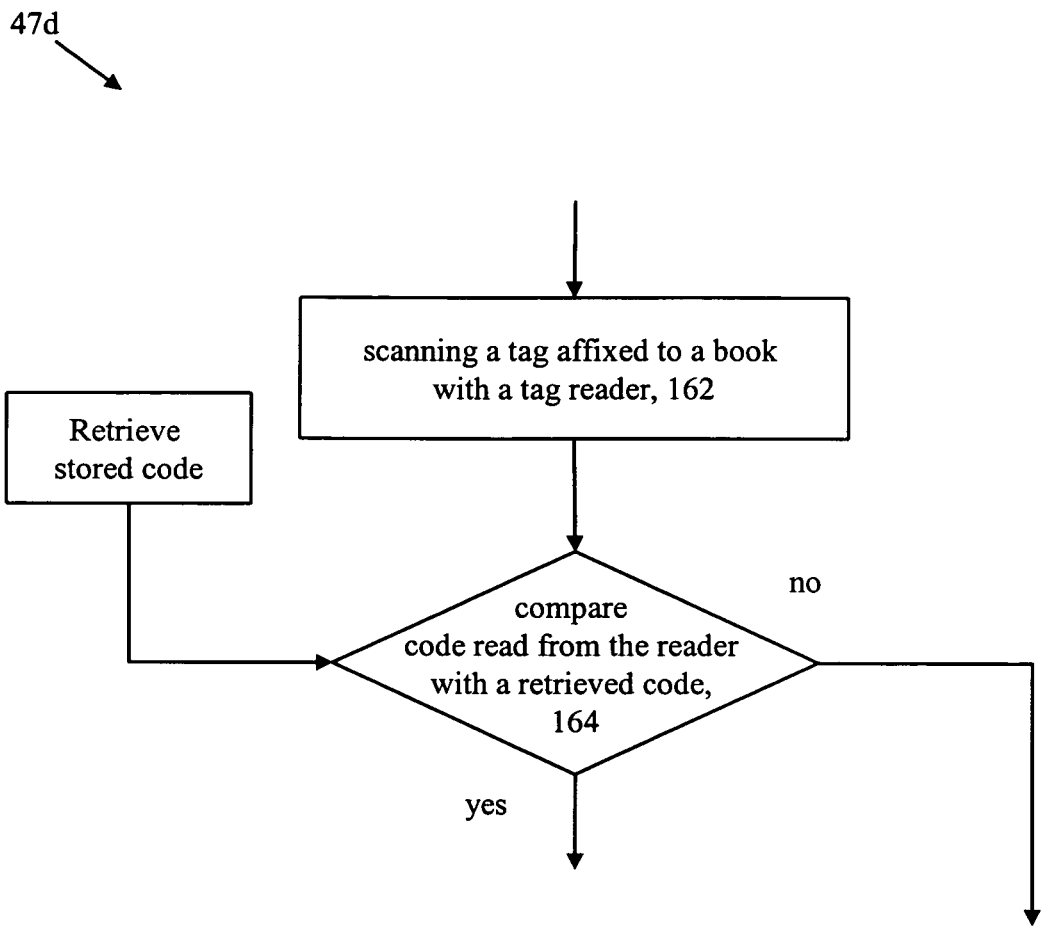
FIG. 8 is a flow chart of a tag based unlocking technique.

Referring to FIG. 8, an alternative test type 47d uses a machine readable code such as embedded in an RFID tag, bar code, or the like. RFID tags are generally affixed to merchandise for inventory tracking and the like. In general, each RFID tag has a different sequence number, code number, manufacturer's number, etc. RFID tags can be affixed to books. In this configuration, the RFID tag is configured at a minimum to identify the title of the book, and optionally a serial number for the book.

For client systems configured with RFID readers, the RFID tag unlocks the content by scanning 162 the tag with the RFID reader and comparing 164 the code read from the reader with a code retrieved 166 from a CD. For implementations using the Internet, a user would connect to the Internet and would be instructed to scan the RFID tag. The process would read the code from the tag and send the code to the website for verification to unlock extra content on a website like FLASH presentation, searchable file or index as discussed above.

Some libraries use RFID tags for inventory management. If not done so already, it would be relatively simple for book publishers, particularly school book publishers, to add RFID tags with unique codes to books the books they print and distribute. Alternatively, in place of an RFID tag and RFID reader, a barcode and bar code reader could be used.

Figure 9:
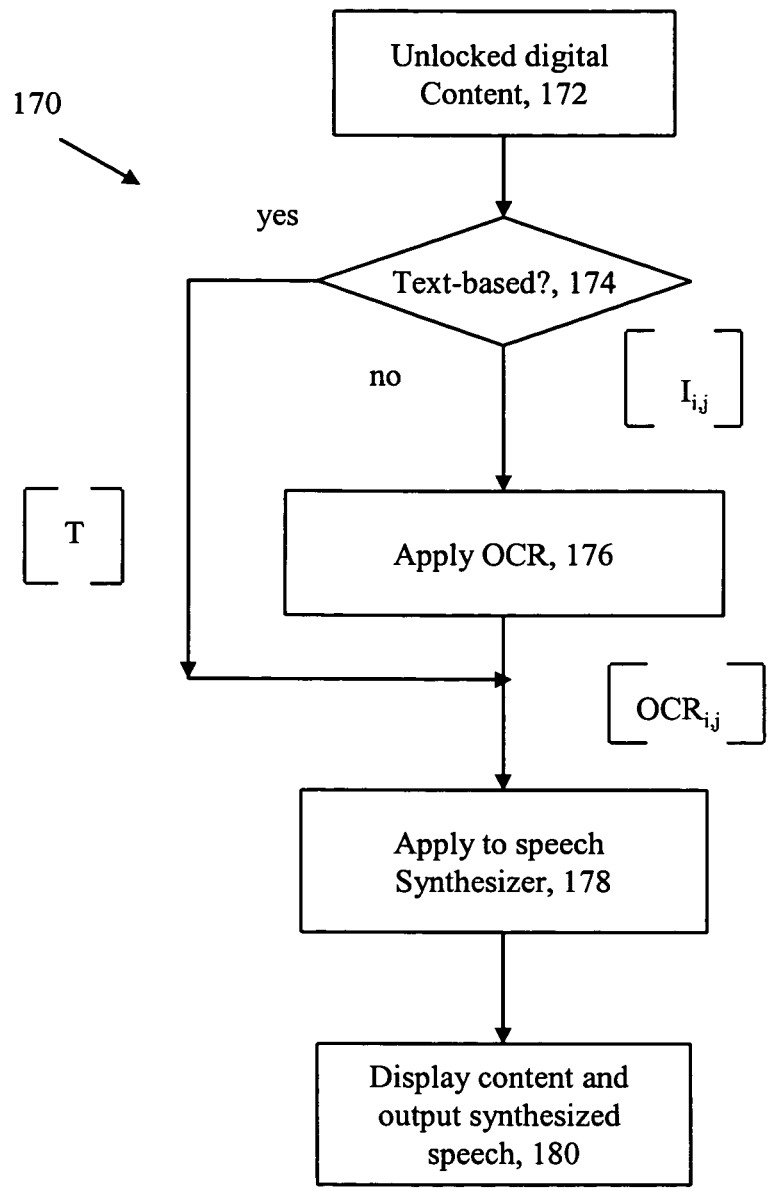
FIG. 9 is a diagram depicting details of a reading machine configuration for the devices in FIG. 1 or FIG. 6.

Referring to FIG. 9, a reading machine implementation 170 uses the digital unlocking process 30 or unlocking process 130 to unlock digital content. In the implementation 170, unlocked digital content is received 172 and the implementation determines 174 if the unlocked digital content is in the form of an image. If the unlocked digital content is in the form of an image, the unlocked digital content is operated 176 on by Optical Character Recognition software to produce text. If the content is already in a text format, a text file from the unlocked digital content is sent or text produced from the OCR software is send 178 to speech synthesizer software to render 180 audio aloud to the user. A display renders the digital content as text or image or other format, and highlighting is applied to the displayed representation in synchronization with the speech. The highlighting indicium could be bold, color, shading, italics, and so forth applied to the item as the item is read. The item could be a word, sentence, phrase, paragraph, etc.

Other representations can be stored in the digital media, for example bitmapped, and so forth. In addition, the digital media can include more interactive or active features that are unlocked. For example, the physical copy of, e.g., a book could include an illustration or picture on a page, and in the digital media could be an applet or other type of executable code and data that could animate the illustration on a display, with visual and audio additions which are not in the physical copy of the book.

A number of embodiments of the invention have been described. Nevertheless, it will be understood that various modifications may be made without departing from the spirit and scope of the invention. For example, while the unlocking software has been described as residing on the same media as the digital content, it need not be. It could be a program or circuit that is executed or operated on a user's computing machine. In addition, while the content has been described in the context of a book, other forms of physical content can be used such as magazines, newspapers, periodicals and so forth. Accordingly, other embodiments are within the scope of the claims

What is claimed is:

1. A computer-implemented method performed by a computing device configured with a tag reader device, the method comprising:
    loading into the computing device from a digital media carrier device, digital media unlocking software;
    reading by the computing device a first access code from the digital media carrier device;
    reading a second access code by the tag reader device from a tag attached to a printed, physical copy of a published item that contains content, with a version of the content in the published item being embodied in digital readable form on the digital media carrier device;
    receiving by the digital media unlocking software, the second access code that results from reading the tag by the tag reader device;
    evaluating by digital media unlocking software executing in the computer, the second access code to determine whether the second access code corresponds to the first access code that is an authorized access code; and
    unlocking, by the digital media unlocking software, executing on the computer, the digital content on the digital media carrier device when the second access code corresponds to the first access code to allow a user to interact with the content on the digital media carrier device.

2. The method of claim 1 wherein the tag is a radio frequency identification tag.

3. The method of claim 1 wherein the digital media carrier is a compact disk local to the computer.

4. The method of claim 1 wherein the digital media carrier is remote from the computer, and the method further comprises:
    sending a message containing the second access code in the tag to a server over a network; and
    receiving a message corresponding to evaluating the second access code at the server, the message allowing unlocking of the digital content if the second access code corresponds to the first code.

5. The method of claim 1 wherein the second access code in the tag is unique to the published item.

6. The method of claim 1 wherein the digital content that is unlocked includes a text-based searchable file.

7. The method of claim 2 wherein the tag reader is used to read the second access code on the tag.

8. The method of claim 1 wherein the digital content is a book stored on the digital media carrier and the physical copy corresponding to the digital content on the digital media carrier is a printed copy of the book.

9. The method of claim 1 wherein the digital content is a book stored on the digital media carrier accessible through a web site on the Internet and the physical copy corresponding to the digital content on the digital media carrier is a printed copy of the book.

10. The method of claim 1 wherein the tag is part of the printed, physical copy of the digital content, and the tag carries a bar code that provides the second access code.

11. The method of claim 1 wherein the digital media carrier is accessible through a web site on the Internet and the tag is a radio frequency identification tag (RFID) tag, and the method further comprises:
    prompting the user to scan the RFID tag; and wherein unlocking further comprises:
    unlocking content on the website when the access code is verified.

12. A computer program product comprises a computer readable hardware storage device tangible storing computer executable instructions for unlocking digital content stored on a digital media carrier device, the instructions executable by a processor device for causing the processor device to:
    load into a computing device from the digital media carrier device the computer executable instructions to unlock the digital content on the digital media carrier device, with the loaded instructions further comprising instructions to:
    read a first access code from the digital media carrier device;
    receive a second access code from a tag reader device that reads a tag, with the tag attached to a printed, physical copy of an item of content, with a version of the content in the physical copy of the item being embodied in a digital readable form on the digital media carrier device;
    evaluate the received second access code to determine whether the received second access code contained in the tag corresponds to the first access code from the digital media carrier device, indicating that the second access code is an authorized access code; and
    unlock by execution of the loaded instructions, the digital content on the digital media carrier device, when the second access code received from the tag reader corresponds to the first access code to allow a user to interact with the content on the digital media carrier device.

13. The computer program product of claim 12 wherein the tag is a radio frequency identification tag and the computer program product comprises instructions to read the second access code from the radio frequency tag.

14. The computer program product of claim 12 wherein the digital media carrier is a compact disk is local to a user's machine and the computer program product comprises instructions to read the first access code from the compact disk.

15. The computer program product of claim 12 wherein the digital media carrier is remote from a user's machine, and the computer program product further comprises instructions to:
    send a message containing the second access code in the tag to a server over a network; and
    receive a message corresponding to evaluating the second access code at the server, the message allowing unlocking of the digital content when if the second access code corresponds to the first access code.

16. The computer program product of claim 12 wherein the tag is part of the physical copy of the digital content and carries a bar code tag and the computer program product comprises instructions to:

receive a scan of the second access code.

17. The computer program product of claim 12, further comprising instructions to:

prompt a user to scan a tag attached to a printed, physical copy of the digital content.

18. An apparatus comprising:

a processor;

a memory;

a scanning device functionally coupled to the processor;

a computer readable medium storing a computer program containing instructions executable by a processor for unlocking digital content embodied in digital readable form on a digital media carrier device that stores a first access code, the computer program comprising instructions to cause the processor to:

load into the apparatus from the digital media carrier device the computer program containing the computer executable instructions to unlock the digital content on the digital media carrier device, with the loaded instructions further comprising instructions to:

read by the processor the first access code from the digital media carrier device;

receive a second access code that results from scanning a tag with the scanning device, with the tag attached to a printed, physical copy of content;

evaluate the second access code to determine whether the second access code corresponds to the first access code; and unlock by execution of the loaded instructions, the digital content embodied in digital readable form on the digital media carrier based upon a determination that the second access code corresponds to the first access code.

19. The apparatus of claim 18 wherein the scanning device is a tag reader.

20. The apparatus of claim 19 wherein the tag reader is a radio frequency identification tag reader.

21. The apparatus of claim 18 wherein the digital media carrier is remote from the apparatus and the computer program product further comprises instructions to:

send a message containing the second access code to a server over a network.

22. The apparatus of claim 18 wherein the tag is part of the physical copy of the content and is in the form of a bar code that has the second access code, and the computer program product comprises instructions to:

operatively read the second access code from the bar code provided from the scanning device.

* * * * *